United States Patent
Kappler et al.

(10) Patent No.: US 8,532,097 B2
(45) Date of Patent: Sep. 10, 2013

(54) METHOD FOR GENERATING AN ADDRESS FIELD, METHOD AND DEVICE FOR TRANSMITTING ELECTRONIC MESSAGE AND DATA PACKET

(75) Inventors: Cornelia Kappler, Berlin (DE); Di Zhou, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 482 days.

(21) Appl. No.: 12/224,620

(22) PCT Filed: Mar. 2, 2006

(86) PCT No.: PCT/DE2006/000398
§ 371 (c)(1),
(2), (4) Date: Dec. 8, 2008

(87) PCT Pub. No.: WO2007/098721
PCT Pub. Date: Sep. 7, 2007

(65) Prior Publication Data
US 2009/0303991 A1 Dec. 10, 2009

(51) Int. Cl.
*H04L 12/28* (2006.01)
(52) U.S. Cl.
USPC .......................................... 370/389; 709/245
(58) Field of Classification Search
USPC ........................................ 370/389; 709/245
See application file for complete search history.

(56) References Cited

U.S. PATENT DOCUMENTS

| 5,740,375 | A | 4/1998 | Dunne et al. | |
|---|---|---|---|---|
| 6,836,806 | B1* | 12/2004 | Raciborski et al. | 709/245 |
| 7,228,337 | B1* | 6/2007 | Bornstein et al. | 709/217 |
| 7,600,042 | B2* | 10/2009 | Lemson et al. | 709/245 |
| 2001/0043601 | A1 | 11/2001 | Yamano et al. | |
| 2004/0199657 | A1* | 10/2004 | Eyal et al. | 709/231 |
| 2006/0268819 | A1* | 11/2006 | Chen et al. | 370/349 |

FOREIGN PATENT DOCUMENTS

| CN | 1444816 A | 9/2003 |
|---|---|---|
| EP | 1 233 572 A1 | 8/2002 |

OTHER PUBLICATIONS

Fenner et al.; "Protocol Independent Multicast—Sparse Mode (PIM-SM): Protocol Specification (Revised)"; Internet Engineering Task Force; Oct. 2004; pp. 1-148.
International Search Report for Application No. PCT/DE2006/000398; mailed Jul. 6, 2006.

* cited by examiner

*Primary Examiner* — Wei Zhao
(74) *Attorney, Agent, or Firm* — Staas & Halsey LLP

(57) ABSTRACT

A simple and flexible method for generating an address field for an electronic message involves forming first and second address part from a string with several characters, such that the second address part denotes those characters of an address whose value is determined by the corresponding character in the first address part and/or denote those characters of the address whose values are variable and generating an address field from the first and the second address parts.

15 Claims, 2 Drawing Sheets

METHOD FOR GENERATING AN ADDRESS FIELD, METHOD AND DEVICE FOR TRANSMITTING ELECTRONIC MESSAGE AND DATA PACKET

CROSS REFERENCE TO RELATED APPLICATIONS

This application is based on and hereby claims priority to PCT Application No. PCT/DE2006/000398 filed on Mar. 2, 2006, the contents of which are hereby incorporated by reference.

BACKGROUND

Described below is a method for generating an address field.

Currently, more and more different types of both mobile and wire-connected communication networks having completely different characteristics and magnitudes are being designed, developed and used for the most varied applications. In this situation, a prerequisite for communication between terminals or network nodes of the communication networks is the question how receivers of an electronic message can be efficiently addressed in future. This applies especially to those electronic messages for which a transmission occurs simultaneously to several receivers.

SUMMARY

Described below is a simple and flexible method for generating an address field.

Accordingly, a method for generating an address field of an electronic message includes forming a first and a second address part from in each case a string with several characters, in such a manner that the second address part denotes those characters of an address the values of which are invariably defined by the relevant character of the first address part and/or determines those characters of the address the values of which are variable, and combining the first and the second address part to form the address field.

The method described below is advantageous since it allows several receivers such as, for example, subscribers or terminals or network nodes of a communication network or of a number of communication networks to be addressed in a simple manner. For this purpose, two address parts are used which jointly specify an address from which receiver addresses allocated to the receivers can be derived. The interaction of the first and of the second address part takes place in such a manner that the second address part denotes those characters of the address the values of which are invariably determined by the relevant character of the first address part. In addition or as an alternative to this, the second address part can also determine those characters of the address the values of which are variable.

In an embodiment of the method, desirable due to its simplicity, in which the first and the second address part contain characters in the form of bits having the possible values 0 and 1, the second address part could be structured, for example, in such a manner that it has a 0 at the locations of the address where the characters are intended to be variable and a 1 at the locations of the address which are intended to be determined by the value of the relevant character of the first address part. The address determined in such a manner allows a number of receiver addresses to be derived. Thus, the address field generated by the method can be advantageously used, in particular in conjunction with electronic messages in the form of so-called multicast messages in which copies of electronic messages with identical content are sent to a number of receivers.

In an embodiment, the method is arranged in such a manner that the first address part only includes those characters of the address the values of which are invariable, and the second address part determines those characters of the address the values of which are variable. This is advantageous since as a result it is possible to omit in the first address part specifying those characters the values of which are denoted as variable by the second address part. Thus, an address field of shorter length is advantageously sufficient for specifying the address.

In addition, described below is a simple and flexible method for transmitting an electronic message to several receivers.

Accordingly, a method for transmitting an electronic message in a communication network from a transmitter to several receivers includes forming a first and a second address part from in each case a string with several characters, in such a manner that the second address part denotes those characters of an address the values of which are invariably defined by the relevant character of the first address part and/or determines those characters of the address the values of which are variable, sending the electronic message with the address parts to a network component, determining the receiver addresses allocated to the receivers in the network component by in each case varying the characters which are variable in their values in accordance with the second address part within a predetermined set of possible values of the characters and transmitting the electronic message to the receivers allocated to the particular addresses.

The method described below offers the advantage that a number of receivers can be addressed simultaneously advantageously by the first and the second address part. For this purpose, the address contains predetermined variable characters. If an electronic message provided with the address having the first and second address part is transmitted by a transmitter to a network component responsible for the transmission of the electronic message such as, for example, a router, it can determine the receiver addresses by the fact that in each case it varies the characters variable in their values in accordance with the second address part within a predetermined quantity of possible values of the characters. In this context, the predetermined quantity of possible values of the characters depends, in particular, on the characters allowed for addressing in the respective case. These can be, for example, the characters 0 and 1 when a binary address is used or the characters 0, 1, . . . E, F when a hexadecimal address is used.

In the case of, for example, the use of a binary-coded address and when only one variable character is present, the method described below has the consequence that by the address, two addresses in each case allocated to different receivers are determined, namely on the one hand, the address of one receiver which is obtained when the value 0 is used for the variable character and, on the other hand, the address of the other receiver which is obtained when the value 1 is used for the variable character. Once the network component has determined the receiver addresses taking into consideration jointly the first and second address part, it transmits the electronic message to the receivers allocated to the receiver addresses determined in this manner. In this context, attention must be paid to the fact that the transmission from the network component does not need to take place directly to the receiver but the electronic message can also be transmitted first to at least one further interposed network component which carries out the further transmission of the electronic message to the actual receiver.

Both the transmitter and the individual receivers can be, for example, in each case a terminal such as, for example, a stationary or mobile computer, a mobile radio telephone, or any other terminal connected to a communication network via a fixed network link or an air interface. In addition, however, the transmitter and/or the individual receivers can also be a network node in each case. In this context, the respective receiver in the form of the respective network node can be arranged either in the same communication network as the transmitter or also in another communication network.

Due to the method described below, the transmitter is advantageously enabled to specify an address to be used in conjunction with the transmission of an electronic message even if the exact receiver addresses are not known to it. Accordingly, corresponding unknown characters of the address can be denoted as variable as a result of which the electronic message is transmitted to all receivers predetermined in this manner.

In addition, the method described below offers the advantage that it avoids the transmission of copies of an electronic message with identical content, via the same transmission link. Instead, the type of addressing advantageously makes it possible that copies of the electronic message are generated only where the transmission paths split due to the different receivers. This corresponds to a transmission of the electronic message in the form of a multicast method and, in particular, also means that the bandwidth needed for the transmission of the electronic message by the transmitter is advantageously not scaled up with the number of receivers.

If the structure of the addresses used has a geographic reference, for example due to the fact that a part of the characters of the address denotes a country, a region, a city, a communication network or several communication networks, receivers in predetermined local areas can be advantageously addressed by the method. This makes it possible, for example, to transmit an electronic message to all network nodes of a predetermined region.

In an advantageous embodiment, the method is arranged in such a manner that the first address part only includes those characters of the address the values of which are invariable, and the second address part determines those characters of the address the values of which are variable. In accordance with the previous statements in conjunction with the method for generating an address field, this embodiment is desirable since it avoids the transmission of those characters of the first address part which are denoted as variable by the second address part.

In a further embodiment of the method, a signaling message is used as electronic message. In this context, an electronic message which is used for controlling or interaction between different components of a communication network or several communication networks is designated as signaling message. Such components can be, for example, network nodes or also terminals within a communication network. Examples of signaling messages are messages for setting up or clearing down a communication connection or for inquiring user data from a network component.

The method described below is advantageously constructed in such a manner that network nodes of a communication network and/or different communication networks are used as transmitters and receivers. This embodiment of the method is desirable since it provides for a simple and efficient type of addressing and of message transmission during the transmission of an electronic message from a network node of a communication network to several network nodes of the same or other communication networks.

The method can also be arranged in such a manner that addresses allocated to the network layer are used as addresses of the receivers. According to the OSI (Open Systems Interconnection) reference model, the network layer, which is also called switched network layer or packet level, is the layer which, in the case of circuit-switched services, is responsible for switching connections and, in the case of packet-switched services, for forwarding data packets.

Using addresses allocated to the network layer as addresses of the receivers is desirable since this provides for multicasting at the level of the network layer. In contrast to multicast methods running on the data link layer, this offers the advantage that the various receivers of the electronic message do not necessarily need to be connected to one another via a common transmission medium. This provides advantageously for a cross-network transmission of an electronic message by a multicast method.

The electronic message can also be a data packet in a packet-switched communication network. In an embodiment, the method proceeds in such a manner that an IP (Internet Protocol) packet is used as electronic message. This embodiment of the method is advantageous since the Internet protocol is a widely used communication protocol for packet-switched data transmission. In this context, during the transmission of data or of a signaling message, a number or, respectively, a large number of IP packets can belong together with respect to content, i.e. in this case the transmitter sends a multiplicity of associated electronic messages in the form of IP packets to the receivers.

In a further embodiment, the method is arranged in such a manner that the IP address of the transmitter contained in the data field "source address" in the header of the IP packet is used as first address part and the second address part is transmitted in a data field "destination address" provided for the IP address of the receiver in the header of the IP packet. This embodiment offers the advantage that it is easily comprehensible and simple in its implementation. In particular, the processing and implementation of the Internet protocol only require slight changes or extensions. However, this embodiment results in certain restrictions with regard to the flexibility in specifying the receivers since the first address part is specified by the IP address of the transmitter.

The method can also proceed in such a manner that a new data field is set up in the header of the IP packet and the first address part is transmitted in the new data field and the second address part is transmitted in the data field "destination address" provided for the IP address of the receiver in the header of the IP packet. This embodiment of the method offers the advantage that it does not entail any restrictions with regard to the possible receivers. However, it must be taken into consideration that a certain effort is required for the corresponding adaptation both of the Internet protocol and of applications of the Internet protocol.

Furthermore, the method can also be arranged advantageously in such a manner that the first half of the data field "source address" provided for the IP address of the transmitter in the header of the IP packet is used as first half of the first address part, the second half of the first address part is transmitted in the first half of the data field "destination address" provided for the IP address of the receiver in the header of the IP packet and a second address part reduced to its second half is transmitted in the second half of the data field "destination address" provided for the IP address of the receiver in the header of the IP packet. In this embodiment of the method, the transmission of a first half, corresponding to the first half of the first address part, of the second address part is omitted, i.e. all characters of the first half of the first address part are invariable, i.e. the corresponding characters of the address are specified by the relevant characters of the first address part. This embodiment offers the advantage that, on the one hand, it is flexible but on the other hand is also easily comprehensible and requires few changes or extensions with regard to the implementation of the Internet protocol or with regard to the implementation of applications of the Internet protocol.

In a further embodiment, the method proceeds in such a manner that a predetermined value of the "IP router alert option" parameter of the header of the IP packet is used as identifier for the use of an address having the first and the second address part. The predetermined value can be, for example, the value 65535. The "IP router alert option" parameter is generally used for indicating to a network component, for example in the form of a router, that the relevant IP packet is to be given special attention. As part of this advantageous development of the method, this parameter can be used to indicate to the network component that the received address is not a usual address but such a one according to the method and thus corresponding processing by the network component is required.

Also described below is a device which provides for a simple and flexible transmission of an electronic message from a transmitter to several receivers.

Accordingly, a device transmits an electronic message from a transmitter to several receivers with a message receiving device for receiving the electronic message with at least one address which has a first and a second address part in each case with a string having a number of characters, in such a manner that the second address part denotes those characters of the address the values of which are invariably defined by the relevant character of the first address part and/or determines those characters of the address the values of which are variable, an address determining device, connected to the message receiving device, for determining receiver addresses by in each case varying the characters which are variable in their values, in accordance with the second address part, within a predetermined set of possible values of the characters, and a message transmitting device for forwarding the electronic message to the receivers allocated to the particular receiver addresses.

The device, for example, can be implemented in the form of a router is advantageous since it is constructed by the message receiving device, in such a manner that it allows the determination of the receiver addresses from the address having the first and the second address part by in each case varying the characters, which are variable in their values, within a predetermined set of possible values of the characters. Forwarding or, respectively, transmitting the electronic message to the receivers allocated to the particular receiver addresses is then possible by the message transmitting device. In this context, the forwarding by the message transmitting device can take place directly to the receivers allocated to the particular receiver addresses or indirectly via one or more further devices which is or are arranged for the transmission of the electronic message on the transmission path from the transmitter to the relevant receiver.

The device may have an address combining device connected to the address determining device, for combining several receiver addresses to form a new receiver address which is built up of a first and a second address part in each case having a string with several characters. This offers the advantage that, in turn, a number of receivers can be addressed by an address having the first and second address part as a result of which the electronic message can be advantageously transmitted in the form of a multicast method.

In a further embodiment, the device takes into consideration information for routing when combining the several receiver addresses. This advantageously enables the address combining device to combine several receiver addresses to form a new address or several new addresses in such a manner that all receiver addresses to be forwarded to the same next network component are combined in the address or the addresses.

Also described below is a data packet which can be transmitted to several receivers in a simple and flexible manner.

Accordingly, a data packet has first and second address parts in each case having a string with several characters which jointly specify the receivers of the data packet, the second address part denoting those characters of an address the values of which are invariably defined by the relevant character of the first address part and/or determines those characters of the address the values of which are variable.

The data packet is advantageous since it allows a simplified addressing by which, on the one hand, not all receiver addresses need to be explicitly known to the transmitter of the data packet and on the other hand, an advantageous transmission of the data packet is provided for by a multicast method in which an unnecessary transmission of copies of the data packet on the same transmission link is avoided.

In a development, the header of the data packet has a marking as identifier for the use of receiver addresses having the first and the second address part. This is advantageous since this enables network components receiving the data packet to recognize by the relevant data packet that the data packet is one which has an address with first and second address parts.

The data packet is advantageously an IP (Internet Protocol) packet. This embodiment is desirable since the Internet protocol is a widely used protocol for transmitting data packets in packet-switched communication networks.

The data packet may be designed in such a manner that the IP packet has the first address part in a data field "source address" provided for the IP address of the transmitter and has the second address part in a data field "destination address" provided for the IP address of the receiver. This is advantageous since it enables the first and the second address part to be transmitted in the IP packet in a simple manner. As already explained in conjunction with the method for transmitting an electronic message, this necessitates that the first address part is identical with the IP address of the transmitter. This applies at least in the case of the reasonable assumption that the transmission of the IP address of the transmitter is mandatorily required in the IP packet.

The data packet can also be designed in such a manner that the IP packet has the first address part in a new data field in the header and the second address part in the data field "destination address" provided for the IP address of the receiver. This advantageously provides for an unrestricted flexibility with regard to the values of the first and of the second address part. This means that there are no dependencies between the values of the two address parts and those of other addresses transmitted in the IP packet.

The data packet may be formed in such a manner that the IP packet has the first half of the first address part in the first half of the data field "source address" provided for the IP address of the transmitter, the second half of the first address part in the first half of the data field "destination address" provided for the IP address of the receiver and a second address part reduced to its second half in the second half of the data field "destination address" provided for the IP address of the receiver. As already explained previously, this advantageous embodiment necessitates certain dependencies since the first half of the second address part may be omitted. However, the resultant certain restriction in specifying the address would only be of slight significance in comparison with the significant advantage that a corresponding IP packet can be introduced with relatively little effort.

In a further embodiment of the data packet, the marking is a predetermined value of the "IP router alert option" parameter. This advantageously provides for a corresponding marking of the IP packet in a simple manner, i.e. particularly without the introduction of an additional parameter.

The data packet may be structured according to IPv4 or IPv6 specifications. This is advantageous since these two versions of the Internet protocol are the currently common, and thus widely used, Internet protocol standards.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
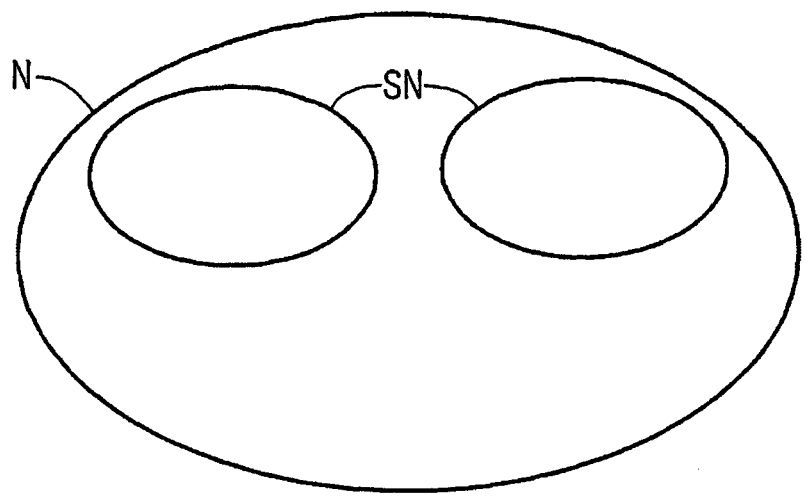
FIG. 1 is a diagrammatic representation for explaining the sequence of an exemplary embodiment of the method for generating an address field.

Reference will now be made in detail to the preferred embodiments, examples of which are illustrated in the accompanying drawings, wherein like reference numerals refer to like elements throughout.

FIG. 1 shows a diagrammatic presentation for explaining the sequence of an exemplary embodiment of a method for generating an address field.

The method for generating an address field can be used advantageously particularly in those cases in which a transmitter only knows a local area or an address area in which receivers, predetermined by it, of an electronic message are located or possibly located at the time at which the electronic message is transmitted.

In this context, the receivers are advantageously addressed by receiver addresses of the so-called network layer such as, for example, IP addresses. In this context, an address of the network layer usually can be represented as a string of characters. Examples of this are strings of characters consisting of the characters 0 and 1 or of the characters 0, 1 . . . , F.

The method for generating an address field now makes it possible to specify the receivers of an electronic message by first and second address parts. The first and the second address part are defined in such a manner that the possibility exists to specify certain characters or sections of several characters of the receiver addresses and to denote other characters or sections of several characters as variable. Thus, for example, the first address part can be given by the string 101010 having several characters and the second address part can be given by the string 110110 having several characters. In this arrangement, a 1 at a position of the second address part denotes that the character at the corresponding position of the first address part is invariable, i.e. specifies the relevant position of the address. In contrast, a 0 at a position of the second address part means the character at the relevant position of the address is intended to be variable. Thus, the first and the second address part define a set of receiver addresses on the network layer, the receiver addresses at the positions at which the second address part has a 1 corresponding to the character of the first address part at this position whilst the receiver addresses can have any other valid value at the positions at which the second address part has a 0.

The consequence of this is that by using variable characters, several receivers of the electronic message can be defined simultaneously by the first and second address parts. In the example previously given, the following receiver addresses are defined by the first and the second address part: 100010, 100011, 101010 and 101011. In principle, the use of two different characters is sufficient for the second address part since it is only necessary to specify whether the corresponding character of the first address part specifies the value of the address at the relevant position or not.

The definition of several receiver addresses by the first and the second address part is advantageous in particular in conjunction with a multicast method in which identical copies of the same message are to be transmitted to several receivers. In this arrangement, a procedure for transmitting the electronic messages is advantageously simultaneously obtained from the first and the second address part. The cause of this is that the receiver addresses of all receivers or potential receivers of the electronic message which can be, for example, a signaling message can be represented in the form of a branching tree. This branching tree can also be used for the purpose of routing.

In practice, the address in the example described before, in which the first address part is given by 101010 and the second address part is 110110, has two sections, predetermined in each case by the first address part, i.e. invariable, of characters (characters 1 and 2 and characters 4 and 5) and of two variable characters (characters 3 and 6). In this case the invariable characters, i.e. bits in the present example, of the first section can specify, for example, an area predetermined by a communication network N, indicated by the large ellipse in FIG. 1. Each further section of invariable bits, having one or more characters, then defines new geographic areas or logical address areas within the area which is determined by the sequence of sections with invariable characters before this invariable section of the address. With respect to the example given, this means that the first two characters of the first address part are denoted as invariable by the second address part. The first address part thus defines an area of a communication network N, which contains all receiver addresses "10xxxx", i.e. all receiver addresses beginning with "10". According to the second address part this is followed by a variable bit which, in turn, is followed by two invariable bits. These define two sub-network areas SN within the area of the communication network N specified by the first two invariable bits, i.e. the receiver addresses "10010x" and "10110x". The areas corresponding to these addresses are shown in FIG. 1 as sub-network areas SN in the form of two small ellipses.

It should be pointed out that the most varied embodiments of the practical implementation of the first and the second address part are possible. Thus, for example, the first address part does not need to be a complete address of the network layer but it is also possible to specify only those characters of the address which are invariable. In addition, it is also conceivable that the address has several first address parts and/or several second address parts. This is meant in such a way that, in this case, the receiver addresses can result, for example, from a combination of all first address parts with in each case all second address parts, the individual combinations being carried out in each case in accordance with the method described before. Thus, the receiver addresses lastly resulting represent the totality of the receiver addresses produced from the individual combinations of the first and of the second address parts.

Figure 2:
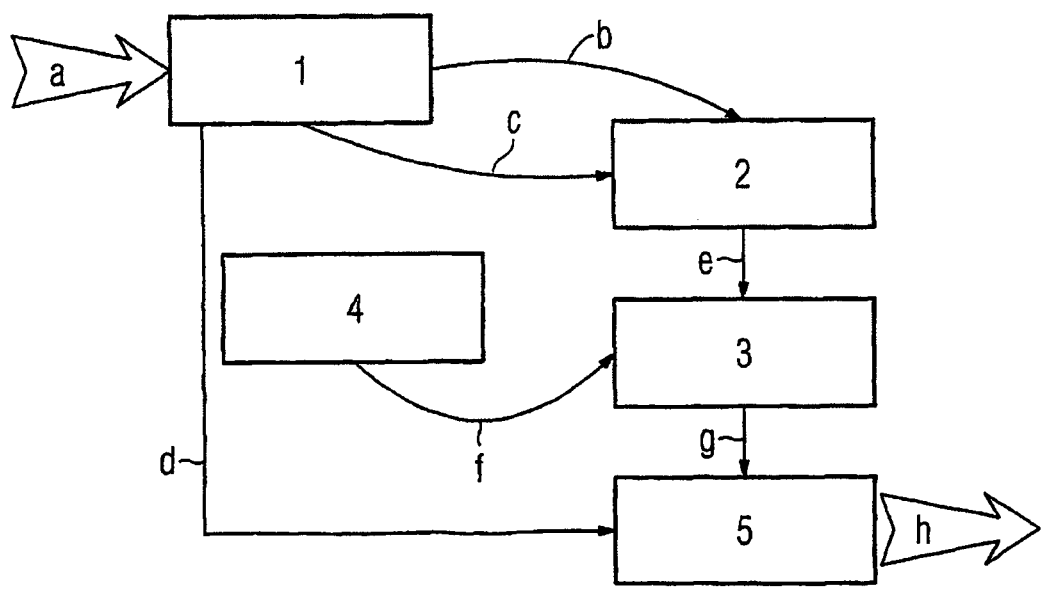
FIG. 2 is a diagrammatic sketch of a flowchart for explaining an exemplary embodiment of an arrangement and method for transmitting an electronic message.

FIG. 2 shows a diagrammatic sketch of a flowchart for explaining an exemplary embodiment of an arrangement and method for transmitting an electronic message. In this context, different components of the device are shown in FIG. 2 in the form of a block diagram and the arrows between these blocks show the message or information flow during the sequence of an embodiment of the method. It should be pointed out that the components shown in FIG. 2 are essentially logical components, i.e. different components do not necessarily need to be implemented by separate hardware or software components.

The large arrow at the top left in FIG. 2 indicates the reception a of an electronic message. Such an electronic message can be both one which has already been forwarded by another network component or one which has its origin in the device shown. In this context, the electronic message can be, for example, a message generated by a user of a terminal or a message generated as part of a program sequence on the device.

The electronic message arriving at a is received by a message receiving device 1 which analyzes the address or addresses inserted in the header of the electronic message. If the electronic message has an address field structured in accordance with the method for generating an address field, i.e. an address which has first and second address parts, in each case a string having a number of characters, in such a manner that the second address part denotes those characters of the address, the values of which are specified invariably by the relevant character of the first address part, and/or determines those characters of the address, the values of which are variable, the message receiving device 1 forwards the first address part via b and the second address part via c to an address determining device 2. Although the corresponding forwarding is represented in the form of two separate transmissions b and c in FIG. 2 for better understanding, it can naturally also take place in the form of a joint transmission.

The actual text of the electronic message is forwarded by the message receiving device 1 to a message transmitting device 5 at d.

Using the first and second address part, the address determining device 2 determines the receiver addresses of all receivers predetermined by the first and the second address part. These receiver addresses are forwarded by the address determining device 2 at e to an address combining device 3 combining several receiver addresses to form a new address which is built up of first and second address parts, in each case consisting of a string having a number of characters.

The address combining device 3 combines the receiver addresses in such a manner that all receiver addresses which are to be forwarded to the same next router are combined to form a new address having first and second address parts. In this arrangement, it is also possible that the receiver addresses to be combined are combined into several addresses first and second address parts or that individual or several ones of the receiver addresses cannot be combined and therefore remain intact in the form of completely determined receiver address not having first and second parts. In the case where only a single receiver address is to be forwarded to the next router or host, the determination of an address having first and second address parts is not required.

The newly determined address or the newly determined addresses and/or single simple receiver addresses are transmitted to the message transmitting device 5 by the address combining device 3 at g.

The task for taking into consideration information for routing 4, also shown in FIG. 2, provides routing information needed at f of the address combining device 3. In this context, the routing information may contain decisions relevant to the routing for the address or for the addresses and/or for each of the receiver addresses, and information, for instance with regard to the address of the next router to which the forwarding is to take place. The precise content and precise type of routing information are significantly dependent on the routing algorithm used.

After receiving the electronic message at d and the new addresses at g, the message transmitting device 5 replaces the old address in the electronic message with the new address having first and second address parts or, respectively, the corresponding new addresses and/or the new receiver address or receiver addresses and transmits the electronic message at h to the corresponding next router or receiver. During this process, the actual content of the electronic message does not change in comparison with the message received at a.

The method sequence described above is advantageous since copies of the electronic messages are generated in principle only for each different next router or receiver which avoids the transmission of duplicated electronic messages via the same transmission path or the same transmission link, respectively.

As already explained before it is possible to use more than one address having first and second address parts for defining the areas into which a multicast message is to be sent. This also applies, in particular, if the electronic message is a signaling message. In this context, it is largely unimportant when defining the address or addresses of the electronic message in the form of the multicast message whether several addresses having first and second address parts are included in an electronic message or whether several copies of the same electronic message are generated, each of the copies only having an address consisting of a first and a second address part in its address field. The method and the structure of the device described above, for example in the form of a router or routing processor, essentially remain the same independently of the embodiment selected in this respect.

Figure 3:
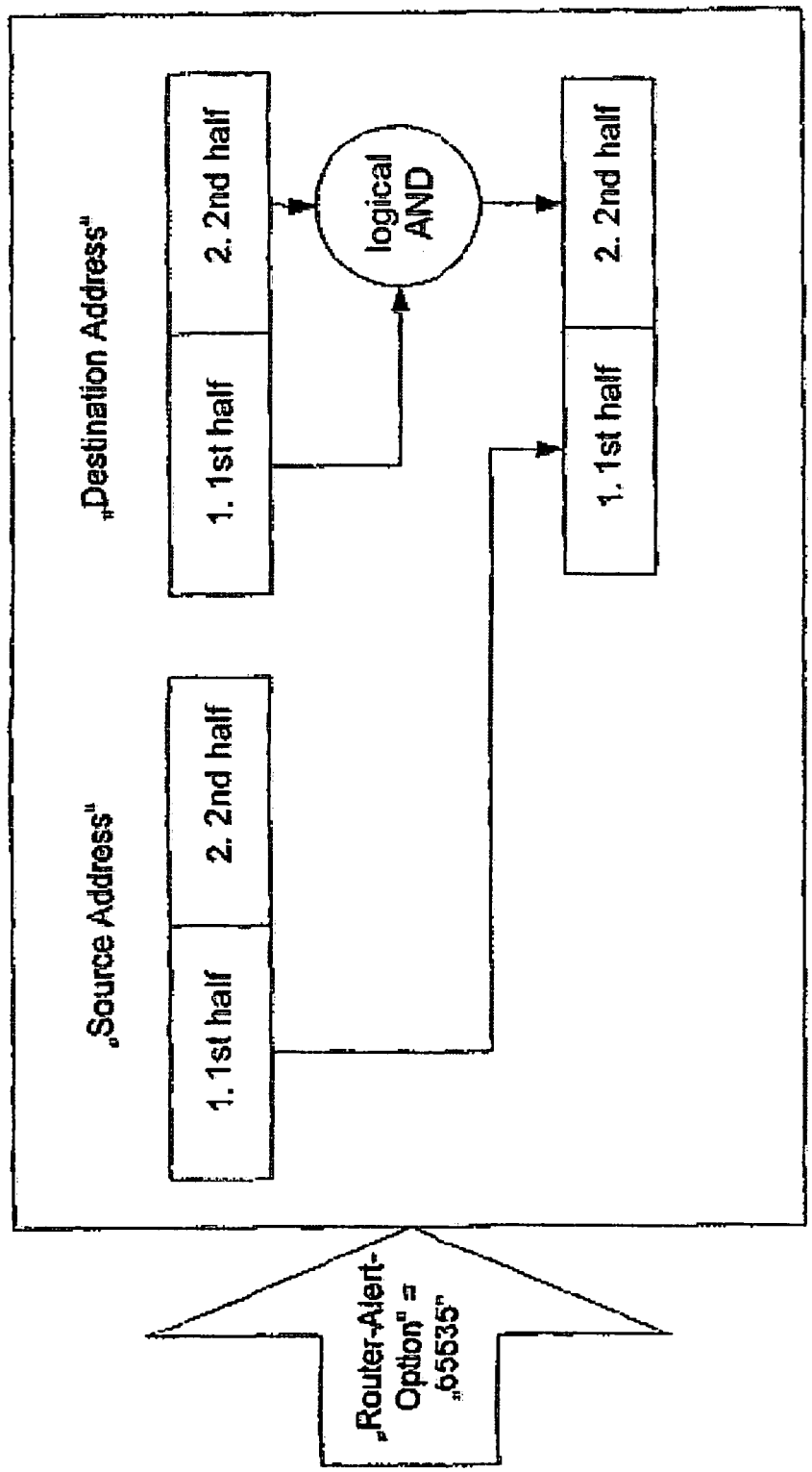
FIG. 3 is a block diagram of an exemplary embodiment of the data packet, the determination of the receiver addresses by an exemplary embodiment of the device for transmitting an electronic message.

FIG. 3 shows in a diagrammatic sketch by an exemplary embodiment of a data packet in the form of an IP packet the determination of the receiver addresses by an exemplary embodiment of the device for transmitting an electronic message.

According to an advantageous embodiment of the method, the IP packet has the first half of the first address part in the first half of the data field "source address" provided for the IP address of the transmitter, the second half of the first address part in the first half of the data field "destination address" provided for the IP address of the receiver, and a second address part, reduced to its second half, in the second half of the data field "destination address" provided for the IP address of the receiver. It is to be generally noted here that an asymmetric distribution of the information to be transmitted in each case in the data fields "source address" and "destination address" is also possible, i.e. it is not absolutely necessary that the two "halves" or parts actually have an identical length or size. However, a corresponding symmetric solution is desirable due to its simplicity.

According to FIG. 3, the characters of the address specified by the first address part are determined in the embodiment shown in such a manner that the first half of the address of the transmitter is taken from the data field "source address" as first half of the address. This means that the first half of the address does not contain any variable characters but it is determined by the first half of the first address part, i.e. by the first half of the parameter "source address".

As already stated, the data field "destination address" also provided in the header of the IP packet contains in its first half the second half of the first address part and in its second half the second address part reduced to its second half. It is thus possible to determine the invariable bits of the address by a bitwise logical "AND" operation on the first and the second half of the data field "destination address". In this context, it must be noted, however, that to answer the question whether a bit is a variable character or an invariable character, the second half of the data field provided for the IP address of the receiver is needed. The corresponding information is needed, in particular for determining the receiver addresses, for example by an embodiment of the device in the form of a network component or of a router, by in each case varying the characters, which are variable in their values in accordance with the second address part, within a predetermined set of possible values of the characters.

The method described in conjunction with the drawings is advantageous in particular for the transmission of multicast messages in the form of signaling messages between communication networks having several network nodes. Thus, as a rule, it is not required to transmit a signaling message, for example in the form of a broadcast message, to all network nodes of a communication network. Instead, a transmission of the signaling message to certain network nodes of the communication network is sufficient in most cases. Such a cross-communication network transmission of a signaling message is not possible by a multicast mechanism running on the link layer.

For example, let it be assumed that the communication networks provided as receivers are implemented on the basis of the IPv4 version of the Internet protocol and have identical addresses in the first half. Furthermore, let it be assumed that the communication networks are divided into four different areas and the communication networks have special network nodes which are assigned in each case receiver addresses having four bits with the value "0" at the end. If a signaling message is then to be sent to all these special network nodes, this can be done by a corresponding multicast message in that for the multicast message, an address is defined which has a second address part "FF.FF.F3.8F" in hexadecimal representation. In this arrangement the section "F3", i.e. the variable characters or bits 21 and 22, respectively, defines the addresses of the four different areas. The variable characters or bits 26, 27 and 28 specify the addresses of all receivers in the form of the communication networks in the areas. The last four bits denoted as invariable by the second address part are in each case specified at the value "0" by the first address part. This restricts the distribution of the multicast message to the special network nodes of the communication networks predetermined for the reception of the electronic message.

It should be pointed out that the method can be used advantageously in combination with existing or new multicast methods on the link layer. Thus, for example, a signaling message can be transmitted to the network components affected, for example in the form of a router or a base station, at the level of the network layer. These components can then decide in accordance with predetermined criteria, for instance with regard to the improvement of features, to use a multicast method on the link layer for the further transmission of the electronic message to the next router or routers, host or receivers.

In general, it should be noted that neither the method described nor the device described, nor the use of the data packet is restricted in any way to certain types of communication networks or certain protocols.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for generating an address field of an electronic message comprising:
    forming first and second address parts having a string with several characters, said forming being in a manner that the second address part denotes one of a) characters of an address having values invariably defined by a relevant character of the first address part, and b) characters of the address the values of which are variable; and
    combining the first and the second address part to generate the address field of the electronic message using which data is transmitted using a device, and
    wherein the first address part only comprises the characters of the address the values of which are invariable.

2. A method for transmitting an electronic message in a communication network from a transmitter to several receivers, comprising:
    forming first and second address parts having a string with several characters, said forming being in a manner that the second address part denotes one of a) characters of an address having values invariably defined by a relevant character of the first address part, b) characters of the address the values of which are variable;
    sending the electronic message with the first and second address parts to a network component;
    determining receiver addresses allocated to receivers in the network component by in each case varying the characters for which the values are variable in accordance with the second address part within a predetermined set of possible values of the characters; and
    transmitting the electronic message to the receivers allocated to the receiver addresses, and
    wherein the first address part only comprises the characters of the address the values of which are invariable.

3. The method as claimed in claim 2, wherein the electronic message is a signaling message.

4. The method as claimed in claim 3, wherein network nodes of the communication network and/or different communication networks are used as transmitters and receivers.

5. The method as claimed in claim 4, wherein addresses allocated to a network layer are used as the receiver addresses.

6. The method as claimed in claim 5, wherein an Internet Protocol packet is used as the electronic message.

7. The method as claimed in claim 6,
wherein the first address part is an Internet Protocol address of the transmitter contained in a source address data field in a header of the Internet Protocol packet, and
wherein the second address part is transmitted in a destination address data field provided for the Internet Protocol address of the receiver in the header of the Internet Protocol packet.

8. The method as claimed in claim 6, further comprising setting up a new data field in a header of the Internet Protocol packet in which the first address part is transmitted, and
wherein the second address part is transmitted in the destination address data field provided for an Internet Protocol address of the receiver in the header of the Internet Protocol packet.

9. The method as claimed in claim 6,
wherein a first half of a source address data field provided for an Internet Protocol address of the transmitter in a header of the Internet Protocol packet is used as a first half of the first address part,
wherein the second half of the first address part is transmitted in a first half of a destination address data field provided for the Internet Protocol address of the receiver in the header of the Internet Protocol packet, and
wherein the second address part, reduced to a second half thereof, is transmitted in the second half of the destination address data field provided for the Internet Protocol address of the receiver in the header of the Internet Protocol packet.

10. The method as claimed claim 9, wherein a predetermined value of an Internet Protocol router alert option parameter of the header of the Internet Protocol packet is used as an identifier for the address consisting of the first and the second address part.

11. A device for transmitting an electronic message from a transmitter to several receivers, comprising:
a message receiving device receiving the electronic message with at least one address having first and second address parts having a string of characters, in such a manner that the second address part denotes one of a) characters of the at least one address having values invariably defined by a relevant character of the first address part, b) characters of the address the values of which are variable;
an address determining device, connected to the message receiving device, determining receiver addresses by in each case varying the characters the values of which are variable, in accordance with the second address part, within a predetermined set of possible values of the characters; and
a message transmitting device forwarding the electronic message to the receivers allocated to the receiver addresses, and
wherein the first address part only comprises the characters of the address the values of which are invariable.

12. The device as claimed in claim 11, further comprising an address combining device, connected to the address determining device, combining several receiver addresses to form a new address which is built up of the first and second address parts in each case consisting of a string with several characters.

13. The device as claimed in claim 12, further comprising means for taking into consideration information for routing when combining the receiver addresses.

14. The method as claimed in claim 1, wherein the second address part determines the characters of the address the values of which are variable.

15. The method as claimed in claim 2, wherein the second address part determines the characters of the address the values of which are variable.

* * * * *

UNITED STATES PATENT AND TRADEMARK OFFICE
CERTIFICATE OF CORRECTION

PATENT NO. : 8,532,097 B2  
APPLICATION NO. : 12/224620  
DATED : September 10, 2013  
INVENTOR(S) : Cornelia Kappler et al.

Page 1 of 1

It is certified that error appears in the above-identified patent and that said Letters Patent is hereby corrected as shown below:

In the Claims

In Column 13, Line 30, In Claim 10, after "claimed" insert -- in --.

Signed and Sealed this
Twenty-fourth Day of December, 2013

Margaret A. Focarino
*Commissioner for Patents of the United States Patent and Trademark Office*